United States Patent [19]
Castillo

[11] Patent Number: 5,574,229
[45] Date of Patent: Nov. 12, 1996

[54] ELECTRONIC WATER METER WITH CORRECTIONS FOR FLOW RATE

[75] Inventor: Juan B. Castillo, Zaragoza, Spain

[73] Assignee: Contadores de Aqua de Zaragoza, La Cartuja Baja, Spain

[21] Appl. No.: 210,927

[22] Filed: Mar. 21, 1994

[51] Int. Cl.$^6$ ................................................ G01F 1/12
[52] U.S. Cl. ............................................. 73/861.78
[58] Field of Search ....................... 73/861.77, 861.78, 73/861.81

[56] References Cited

U.S. PATENT DOCUMENTS

| | | | |
|---|---|---|---|
| 3,965,341 | 6/1976 | Honey et al. | 73/861.77 |
| 4,033,883 | 7/1977 | Zinsmeyer et al. | 73/861.7 |
| 4,337,655 | 7/1982 | Sundstrom et al. | 73/861.77 |
| 4,581,946 | 4/1986 | Kanayama | 73/861.77 |
| 4,940,976 | 7/1990 | Gastouniotis et al. | 73/861.77 |
| 4,969,365 | 11/1990 | StrigÅrd et al. | 73/861.77 |
| 5,016,187 | 5/1991 | Forkert et al. | 73/861.77 |

*Primary Examiner*—Richard Chilcot
*Assistant Examiner*—Harshad Patel
*Attorney, Agent, or Firm*—Eliot S. Gerber

[57] ABSTRACT

In conventional water meters, there is not a proportion between the flow velocity of water flowing through the meter and the movement of the part that measures, i.e., the rotation of the turbine. That lack of proportionality may be a cause of error. This problem is solved by an electronic automatic correction system, which compares the measurement data with a data base stored in its memory, effects the necessary corrections and supplies the exact reading of the actual volume of water used. The meter is able to detect low water flow and water leakage.

8 Claims, 7 Drawing Sheets

ELECTRONIC WATER METER WITH CORRECTIONS FOR FLOW RATE

FIELD OF THE INVENTION

The present invention relates to fluid meters and more particularly to electronic water meters.

BACKGROUND OF THE INVENTION

The supplying of sufficient quantities of high-quality drinkable water to the population and industry is becoming a problem in many regions. The demand in many instances grows every day, but the supply of existing water may remain the same or even be reduced due to pollution. Consequently, the cost of collection, transportation and treatment of water may become greater. The correct control of consumption may be of the utmost importance in conserving water.

Water meter technology has been attentive to this necessity. In the past decades there have been notable improvements in precision and reliability of water meters.

Unfortunately, the physical principles which underlie the function and requirements of the meters are fixed, which makes it difficult to improve the state of the technical aspects of such meters. The function of a conventional water meter is based on the routing of the water being measured past the moving measurement part, generally a revolving part ("rotor"), such as a wheel or turbine. This part is moved by the passing of the water, and its movement is supposedly proportional to the velocity of the flow of the water. That is to say, a fixed quantity of water, for all flow rates, is assigned to each turn of the measuring part. But this proportion does not apply over the entire range of the meter's measuring capability, because of the impact that occurs when the fluid contacts the moving part. This impact produces alternations in the flow which are not proportional to movement of the rotor, but to the second and up to the third power of the water velocity, which produces errors in the measurement.

The whole water meter system is precise due to the fact that it is low in friction with respect to the bearing which mounts the rotor. Therefore it is essential that there be no additional friction which would decrease the rotor's sensitivity. A loose fitting inevitably provokes volumetric losses due to the fact that water will escape through the loose fittings. Depending on the circulated flow, the amount of water which fails to be measured by the meter may be considerable, such failure occurring with low flow rates of water. The moving measurement part, i.e., the rotor, falls behind with respect to the flow rate, giving an incorrect measurement.

The confluence of these factors is reflected in the lack of precision of the conventional meters, especially in the low flow rate range of measurement. Organizations responsible for approving water meters generally allow or recognize, in their regulations, a higher occurrence of measuring errors in the low flow rate range of metering. This range produces up to 2.5 times as many errors as the remainder of the flow rate range. There is also an "uncontrolled" zone (not measured) from the flow rate of zero up to the rate in which the errors mentioned above is reached.

This can be graphically represented, taking into account the following factors:

$Q=O$ or $Q2$: starting flow rate—minimum flow rate that the rotor needs to turn Qmin: minimum flow rate; the lowest flow rate that can be measured in which the precision of the meter remains within the margin of error allowed by the regulations for the measuring at the lowest flow rates (±5%) in European standard.

Qt: flow rate of transition, the flow rate within which the precision of the meter has passed the margin of error, to the normal for the rest of the measuring range, or up to the maximum flow rate (Qmax), whose maximum error is ±2% in European and AWWA standard.

"Uncontrolled zone" is the zone between the flow rate of zero and the minimum flow rate. It is the zone in which the precision of the meter is outside the margin of error. The meter doesn't measure, or it measures in a manner that is not controlled.

There are regulations for four classes of water meters: A, B, C and D (European Standard 77/33/CEE). The requirements of these meters regarding precision in low flow rates, up to rates of 15 $m^3$/hour (cubic meter/per hour) are represented in FIG. 2. FIG. 2 has taken, as an example, the minimum and transition flow rates, corresponding to a meter of 3 $m^3$/hour. This type of water meter represents a high percentage of the installed meters.

In FIG. 2 the major requirements of precision are shown according to the advance in meter classes. The requirements of the uncontrollable zone, as well as the margin of error, diminish notably.

Centering on the class with the highest requirements, class D, there exists an uncontrollable zone that goes from zero flow rate up to a flow rate of 11 liters/hour, and the largest margin of error extends to 15 liters/hour.

This situation points to the fact that low flow rates, which can be caused by small leaks in many different situations, are not measured or are measured incorrectly. This is one of the biggest problems facing water distribution companies, the discrepancy between the water actually billed to the consumers and the total amount of water actually supplied to the customers. In addition, there is no way to detect leakage in the system or leakage on the customer's premises for flows in the uncontrolled zone.

This happens because not a lot of importance is given to the multitude of small leaks that exist in private homes, and commercial and industrial areas. However, it is evident that the sum of all of these leaks translates to a large waste of a scarce natural resource.

U.S. Pat. No. 4,798,092 to Lagergren relates to a flow-meter to measure a volume of fluid per unit of time, for example, gallons per minute. In contrast, a water meter (fluid-meter) measures the quantity of a fluid, for example, the number of gallons. Lagergren generates a pulse width modulated (PWM) pulse stream in which the width of the pulses are proportioned to the flow rate. In contrast, applicant uses signal frequency (pulses per unit of time which is proportional to the number of turns of the water meter rotor). Lagergren corrects the pulse width signal to accord with the actual flow rate using a look-up table, generally in RAM (Random Access Memory).

In U.S. Pat. No. 4,301,457 to Fukui the period of the output signals of the rotor of an electronic water meter is calculated to derive the volume of water which flowed during that period. Fukui's system requires continuous calculations that result in a system which is relatively complex, costly and has high power consumption.

SUMMARY OF THE INVENTION

This invention consists of improvements for fluid meters, which are applicable to electronic water meters that makes use of, or may use, an electric signal to indicate the movement of the moving measuring part. Preferably it is applicable to water meters using a magnetizable turbine rotor.

The improvements consist of the use of a correction electronic circuit which receives the electrical signal transmitted by a magnetic sensor. It compares the signal with data stored in its memory. It then processes and corrects the information and provides the corrected measurement of the real volume through the meter.

It is able to be programmed either directly or over a communication line, to detect leaks at any determined specific flow rate desired. If a leak is detected, it will indicate the leak on its display and is capable of transmitting a signal, representing the leakage warning, to a central station or recorder.

DETAILED DESCRIPTION OF THE INVENTION

Figure 1:
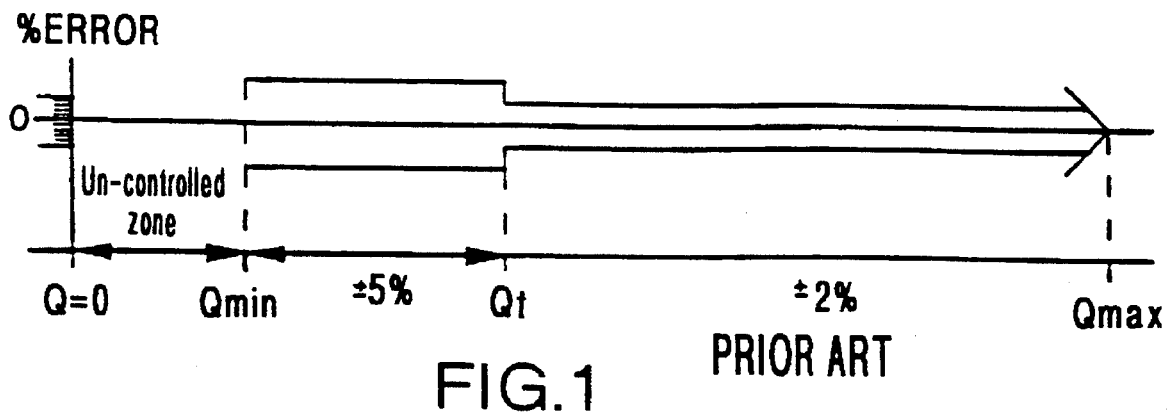
FIG. 1. This diagram is a graph which shows the parameters that define the precision of a conventional water meter.

The problem with the conventional meters could be corrected if instead of measuring directly the movement of the measuring part, i.e., the rotor, it would compare its movement with a data base, in which the differences between the movement and real fluid volume flow were previously stored in memory.

This objective is achieved by means of the present invention using an electronic circuit, which receives a signal that is transmitted from a magnetic sensor. It compares the signal with data stored in its memory and then processes and corrects the information to provide a number representing the real volume consumed.

A water meter, whose function is based on the movement of a part subjected to the effects of the flow of the liquid to be measured, typically uses a rotor with blades or a rotor with paddles (turbines), although other measuring devices may be used, such as oscillating movements, alternating movements, etc.

The moving measurement part of the meter will be called the "rotor", which in any case is capable of producing a magnetic frequency signal proportional to its movement. The signal, which travels through the wall of the watertight body of the meter, is picked up in the exterior by the magnetic sensing system which converts it to an electrical signal.

The electrical signal, in the form of analog pulses, is directed to an electronic comparator circuit which digitizes the signal.

Up until now there exists a perfect correspondence between the signal emitted from the rotor and the digitized signal. But, as explained before, there is not a direct proportion between the flow rate at any one time and the rotation of the rotor.

This disproportion has a historical base for each type of meter. This base is used for making the necessary corrections in transforming the disproportion of the signal emitted from the measuring part to an output of data proportional to the flow. This is performed with the electronic correction system of the meter. First, it is necessary to learn the characteristics of the measuring part and its deviation (disproportion) in all ranges of the meter's measurements.

To do that, a meter is installed on a highly precise and reliable test bench. The test bench supplies exact rate of flow, from the minimum to the maximum, over the range of meter measurements, with no limitations in the escalation of those rates. The water flow at the specified rate rotates the rotor and the rotor movement frequency is noted, corresponding to the particular flow rate. Through a simple mathematical formula for each possible rotor frequency, the number of turns of the rotor that corresponds to a determined unit of volume (cubic feet, gallons, liters, etc.) is determined.

This information is incorporated in the memory of the meter's electronic system for the automatic correction system. Preferably an ASIC (Application Specific Integrated Circuit) is used, although in some cases a microprocessor or micro controller (microprocessor with memory and peripherals) can be used for the same function.

The ASIC measures, periodically, the digitized frequency of revolutions and calculates the number of rotor revolutions that correspond to a unit of volume. Later, it would only count the number of revolutions of the turbine (rotor) and an output pulse would be emitted (signifying the accumulation of one unit of volume) each time that the number of revolutions equals the number determined (calculated previously) to amount to one unit of volume.

As shown in FIG. 1, in conventional meters there is an uncontrollable zone. Then there is a zone starting from the minimum flow rate (Qmin) up to the transition flow rate (Qt), and this zone has a margin of error of ±5%. The third zone is from Qt up to the maximum flow rate (Qmax); this zone has a margin of error of ±2%.

Figure 2:
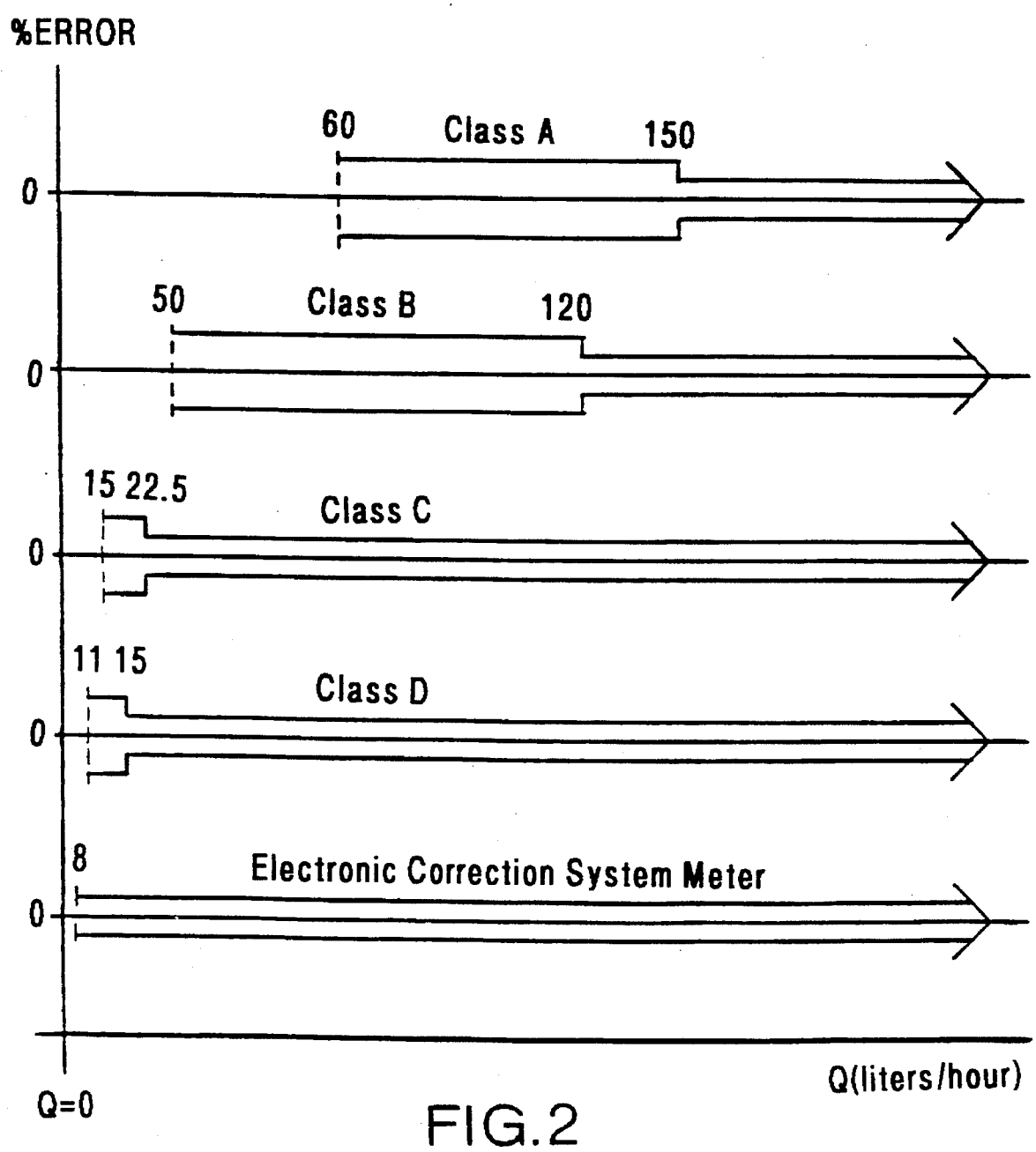
FIG. 2. This diagram is a graph representing the characteristics of class A,B,C and D water meters as well as the new meter corrected with the electronic correction system of the present invention.

FIG. 2 illustrates the characteristics of the meter classes A,B,C,D and of the meter corrected with the electronic correction system.

To achieve automatic correction, it is first necessary to learn the characteristics of the rotor. The revolution frequency for each possible flow rate must be learned. This can be done by tests, previously described, on a test bench (see FIG. 3) for the "prototype" meter. Preferably the "prototype" meter is one which is made to the standard of a production run of, for example, 10,000 meters.

Using a flow regulator to regulate the flow of water through the meter, various tests are performed. Therefore we can obtain for each flow rate the frequency of the rotor 2 that is being tested. For each rotor frequency possible, one obtains the number of pulses from the rotor that corresponds to a determined unit of volume (liters, gallons, cubic feet, etc.) "D" coefficient or Division coefficient is the number of pulses that correspond to a determined unit of volume. Each turn of the rotor produces a number of pulses equal to the number of magnetic positive blades (usually one-half of the number of blades of the rotor).

A set of tests is performed on each meter rotor of the production run. Preferably the tests find ("D") coefficients at three flow rates (Q). Using a computer and data from the prototype, the real curve of the meter rotor is calculated and entered into the meter's non-volatile memory.

In assembling meters, all turbine rotors have minor differences which require correction. When a new model is chosen for a turbine rotor, a standard (master) curve is made. However, each meter still has to be adjusted to account for the minute differences in the physical characteristics of the turbine rotor.

The procedure used is as follows:

1— Study the turbine rotors until a model ("prototype") is obtained that is trustworthy with precise deviation.

2— For every turbine rotor find the "D" coefficients for at least two and preferably three flow rates (Q).

3— Utilizing the model for the deviation and empiric information calculate, with a computer, the real curve of the flow rates of the turbine rotor.

4— This curve is saved or recorded in the non-volatile memory device for each meter obtaining a precise linearization. Preferably the curve is in the format of a look-up table.

The following is a specific example of this procedure. With a turbine rotor weighing 0.1 ounces (3 grams) and having 6 blades and an outside diameter across the blades of $13/16$ inches (21 mm) the three flow rates were taken to $Q_{max}=3$ m$^3$/h, $Q_t=0.0025$ m$^3$/h and $Q_{min}=0.015$ m$^3$/h. The initial real curve of the turbine rotor is compared with the calculated curve. A specific example is as follows:

| Flow rate (Q · m3/h) | Frequency (F · Hz) | Rotor pulses volume unit (pulses/m3 × 1000) |
| --- | --- | --- |
| Qmax (3m$^3$/h) | 367.00 | 443 |
| Qt (0.00225 m$^3$/h) | 2.46 | 393 |
| Qmin (0.015 m$^3$/h) | 1.45 | 341 |

Figure 4:
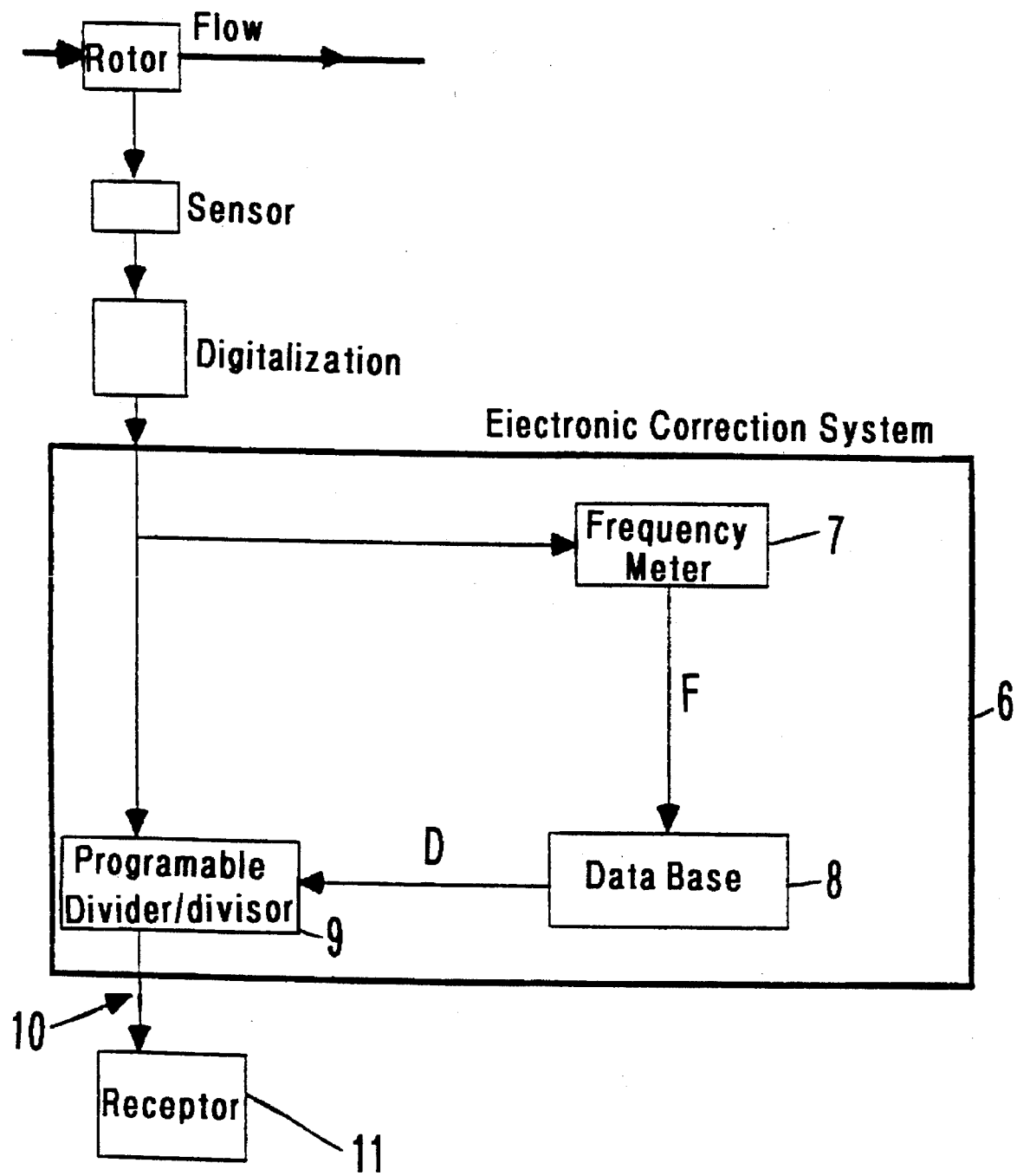
FIG. 4. This diagram is a block circuit diagram of the electronic correction system.

FIG. 4 shows that the electronic correction system 6 includes a tachometer or frequency meter 7, which counts the number of times that the digitized signal changes, over a period of time, using an oscillator for the determination of time.

The calculation "D" (S) (number of rotor pulses/unit of volume) is done by consulting the electronic correction system memory's data base and logic equations.

The programmable divisor/divider 9 is carried out with one or various preselectable binary counters.

The resulting volume output pulses 10 can be sent to a remote accumulation unit 11, or can be accumulated by the electronic correction system.

There is also the possibility of other equivalent forms of correction. All of the operations listed above can be achieved with rotor cycles or periods instead of frequency (period is inverse of frequency). Instead of obtaining the number "D" of pulses from the rotor/unit of volume for each possible flow rate one can obtain the quantity of volume "V" corresponding to a turn of the rotor and accumulate this volume in the meter each time the rotor turns ("V" in this case is the inverse of "D").

Being that the information is in electronic format, this can be easily shown with liquid crystal displays or other types, and transmitted by whichever means, light (infrared transmission link, fiber optics, etc.), conductor cables (direct or dedicated, telephone network, power line carrier, private television network), magnetic and electromagnetic waves through the air (magnetic transmission, radio), etc.

In this manner the precision problems of conventional meters are corrected, correcting the disproportion between the movement of the measurement part and the real volume flow and therefore obtaining a highly precise reading of water consumption in all the measurement ranges of the meter.

Consequently, this allows the elimination of the enlargement on the margin of error in the lower range of measurement. It also reduces the uncontrollable zone, initiating the correct meter measurement of low flow rates as shown in FIG. 2 for the meter corrected with the electronic correction system.

Taking into account that the majority of the conventional meters fabricated are in class B, the present invention presents notable increment of precision and higher sensitivity.

Figure 5:
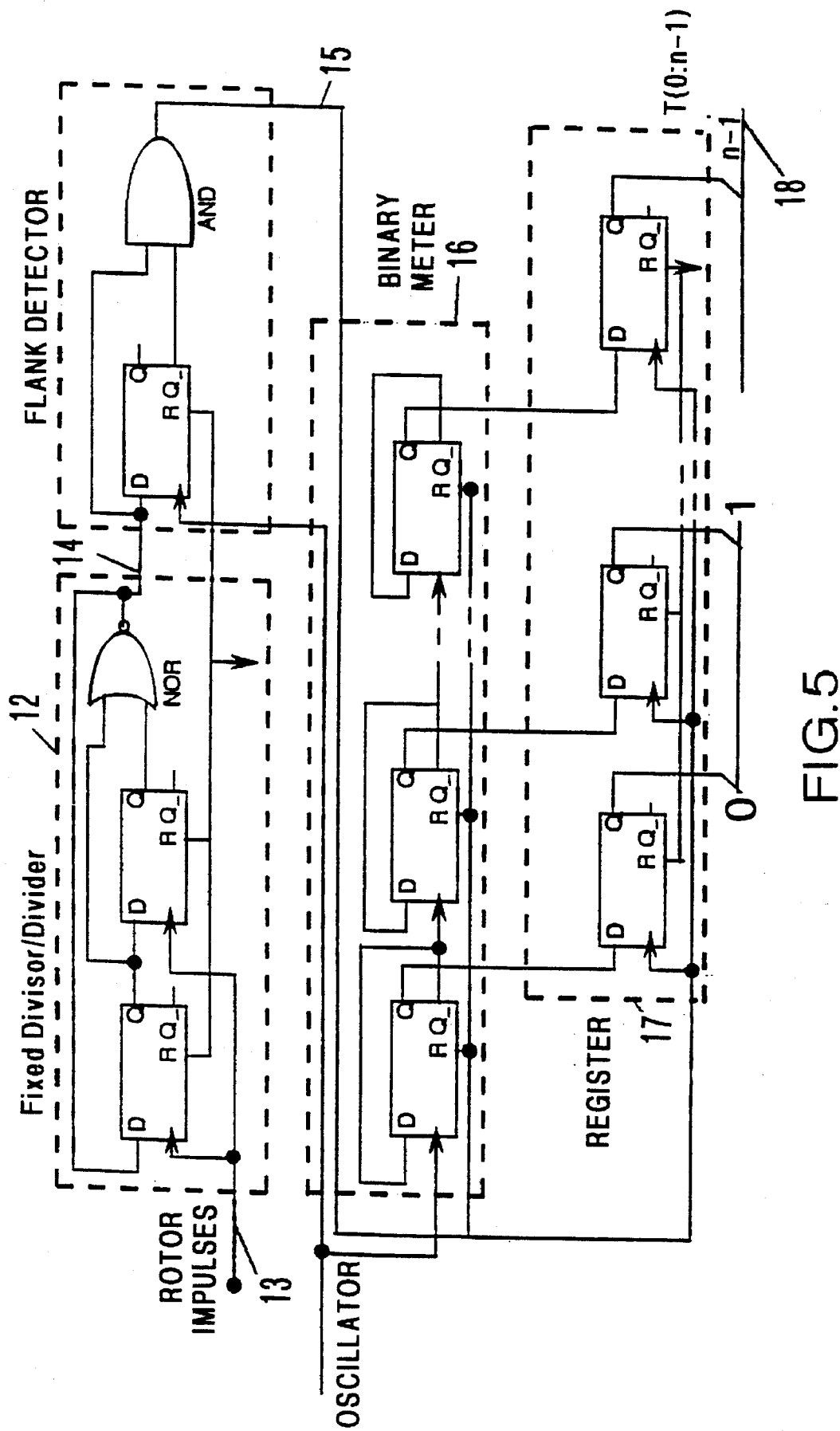
FIG. 5. This diagram shows the frequency meter scheme.

FIG. 5 show a method for finding the frequency of the rotor. The circuit finds the period/cycle of the rotor and the frequency is the inverse of this period/cycle (F=1/T).

With that, a fixed first divisor/divider 12 divides the entering digitized rotor pulses by the number of magnetics of the rotor, obtaining a signal 14 whose frequency coincides with the frequency of the rotor. For example, a rotor having 6 blades, 3 magnetic positive and 3 magnetic negative, each positive blade produces a pulse. The rotor will generate 3 pulses for each of its turns. The divider 12 performs division by 3 in this example. This signal connects with an edge detector which produces a signal or pulse 15 for each turn of the rotor. This signal 15 causes two effects:

Resets (sets to zero) the meter 16 that increments 1 for each cycle of an oscillator.

Just before setting the meter 16 to zero, the value of the meter 16 is loaded in the register or latch 17 using the delay of the same circuits.

The value of the meter that is loaded in the register is the number of cycles counted by the master clock during the complete cycle of the rotor. The register contains the real period of the rotor measured by the number of oscillations of the oscillator and codified in n bits 18.

It is very important to emphasize that the period, or frequency, of the rotor is obtained by one complete turn of the rotor, through a fixed divider/divisor 12. A high degree of precision is obtained through the process and it also avoids any problem caused if different magnetic signals emitted from the rotor are not of the same intensity.

If obtaining the frequency is required, one may calculate the inverse of the period, or directly through a circuit different from that of the diagram, counting the number of pulses of the rotor in one relatively large unit of time generated by an oscillator. In any event, the frequency is corrected, using the correction curve (look-up table) to provide a corrected signal output to measure the volume of water which flows through the meter.

Figure 6:
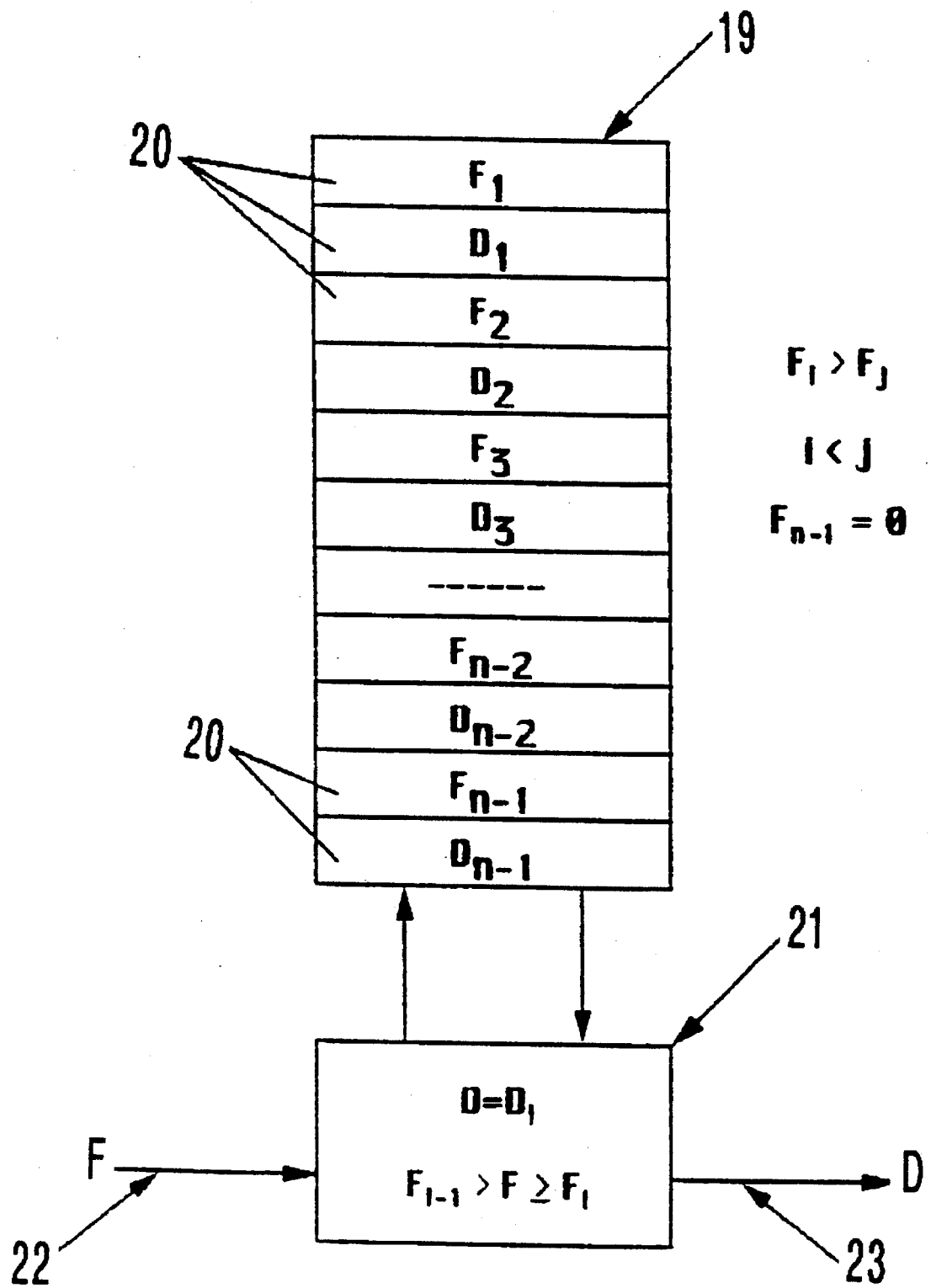
FIG. 6. This diagram shows the data base scheme.

FIG. 6 deals with the data base. The coefficient of division "D" is obtained, beginning with the frequency "F", calculated by the frequency meter, using the information stored in the memory which contains the frequencies "Fi", and the coefficients of the division of "Di" to which they correspond. That correspondence is obtained from the meter previously tested in the lab test/bench.

A memory 19 is used, normally a non-volatile semiconductor type, ROM, EPROM or EEPROM, preferably a EEPR. In the memory appears, in alternating words 20, the values of the frequencies Fi and the values of the division coefficients that correspond Di.

In reality, each coefficient of division Di would apply to whichever frequency between Fi and $Fi_{1-p}$, so that $F_{n-1}$ is equal to zero.

A logic circuit 21 receives the frequency F 22 from the frequency meter. It reads the memory from the first (F1) until it finds an Fi, provided that F≧Fi. Once obtained, it reads the next memory position that contains the value Di which would be placed in the output D (23) that would be used for the programmable divisor/divider.

Figure 7:
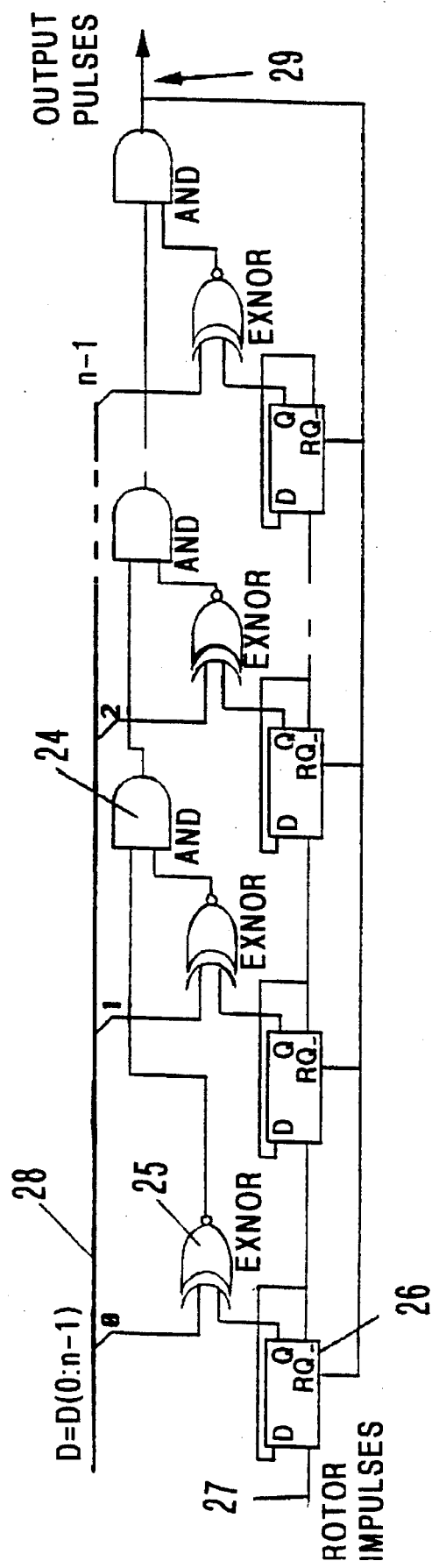
FIG. 7. This diagram shows the programmable divisor/divider scheme.

FIG. 7 shows a preferable form of the programmable divisor/divider. Three types of logic circuits AND-type gates 24, exclusive NOR-type gates 25 and D-type flip-flops 26 are used. This form is suitable to be integrated in an ASIC, using elements from the manufacturer's library, or with SSI logic circuits, like those of the family 74LS, 74HC, etc. In the case of a microcontroller or microprocessor, an internal counter with software (with or without the help-specific hardware) should be used.

In FIG. 7 the rotor pulses 27 enter at the left. These pulses of the rotor 27, which are digitized, correspond to rotations of the rotor and reflect the volume of water flow. They are divided by the number of pairs of magnetic poles of the rotor. The figure also shows the coefficient of the division D 28, which is the number of pulses of the rotor per unit of volume, codified in binary format with n bits of resolution (from zero to n–1). For example, if D=23, and n=6, it should codify (in the input) 010111. If an appropriate circuit was constructed from its output 6, one output pulse would appear for each D rotor pulses at the input. In this case, D is the number of pulses per unit of volume, and the circuit would produce an output pulse for each unit of fluid volume that passes through the meter.

All this is achieved at a reasonable cost, so that the water meter is very competitive in the market.

Another improvement is that the precision requirements of the moving measurement parts of conventional meters (which are necessary so that the product is approvable according to the regulations) is not important in the meters according to the present invention. The necessary corrections can be made so that the final measurement is correct without great accuracy in reproducing the rotor, which presents an additional benefit in costs of production.

The example set forth above is of water meters, including domestic water meters and industrial water meters. However, the improvements may be applied to all types of meters capable of measuring the consumption of fluid, and such fluid meters could incorporate the improvement, therefore increasing its precision and/or increasing the rank/class of measurement of the water.

Figure 8:
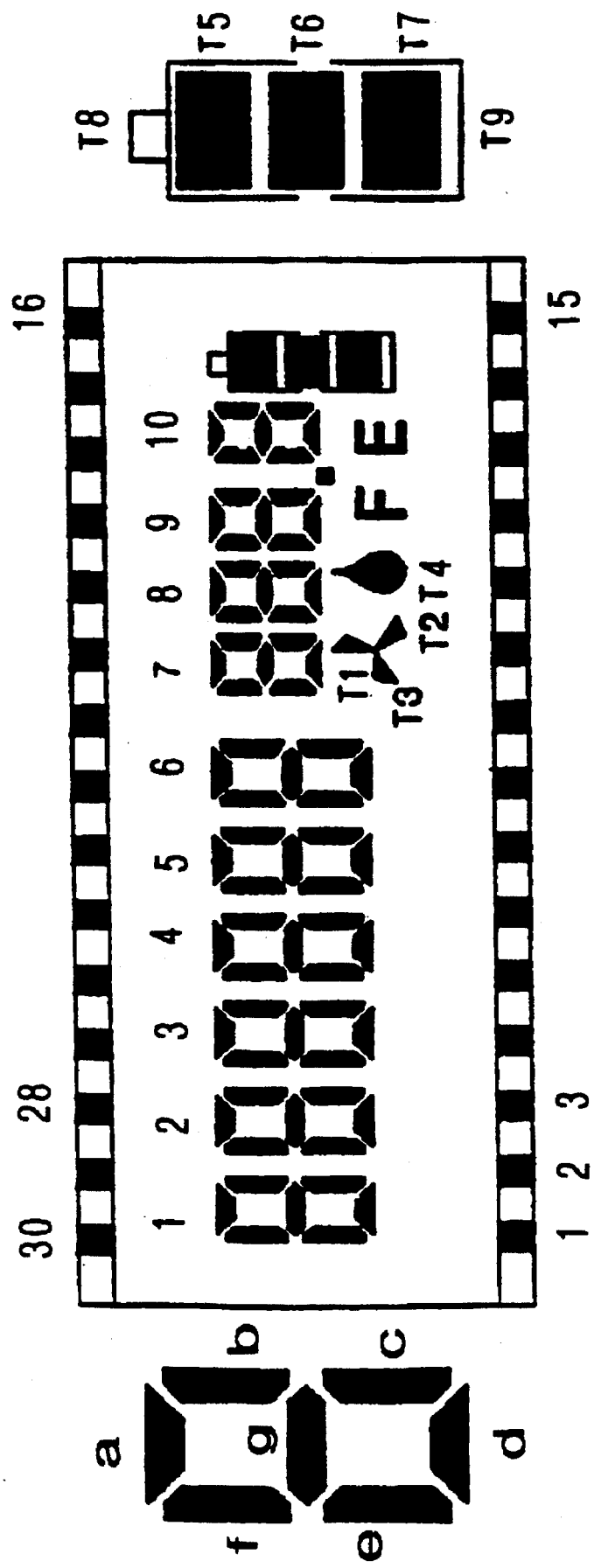
FIG. 8. This shows the display of the motor.

When the meter detects consumption of water or fluid below a certain level during a prolonged period of time, for example, more than one minute, the indication C3B is activated (Continuous Low Flow Use), see FIG. 8. The flow level below which the indication C3B is activated can be configured for each type of meter through the writing of parameters in the meter's non-volatile memory. When the indication C3B is activated, a symbol of a small drop of water appears in red blinking in the LCD (Liquid Crystal Display) (T4 in FIG. 1). When the meter is read automatically (AMR: Automatic Meter Reading) for example, by telephone, it sends the information from the meter's remote location about leaks it has detected to a central station.

The C3B indication is activated until the meter detects that the turbine rotor is completely stopped (there is no water flow). If the meter detects a high flow (because somebody has opened a tap, for example) while the C3B indication is activated, it will still remain activated. So if the meter is read (visually or automatically), while the flow is high, it is still possible to detect the leakage problem.

As explained above, the meter constantly measures the revolution cycles of the rotor turbine and compares the cycle with its programmed memory and if it is greater for more than one minute, the microprocessor activates the "C3B" indication. If the revolution cycle of the rotor turbine is greater it signifies that the flow is lower. When the indication is activated, the meter continues measuring the water passing through the meter and it also makes the drop of water blink in the display. If an automatic reading is taken (via telephone, etc.) while the indication is activated, it transmits a bit at 1. This bit communicates to the remote receptor (central station) the information that the indication "C3B" is activated and therefore a leak probably exists.

In addition, the water meter has other improvements. The meter obtains the display total, i.e., gallons, liters or cubic feet, in non-volatile memory. A well-known disadvantage of electronic system is the "volatility" of the information. When there is a disruption of power (electricity), the stored information is lost. In the case of mechanical or electromechanical meters, the information is normally retained even if there is a disruption in the delivery of power.

The meter of the present invention utilizes a non-volatile memory device which permits it to re-establish the lost data which was displayed before the disruption of power, i.e., the condition of the primary battery. If the meter is vandalized, it is normally possible to recover the data which had accumulated before its destruction.

Preferably the non-volatile memory, which can be written and erased electronically, is an EEPROM (Electrically Erasable and Programmable Read Only Memory). The meter incorporates an EEPROM and writes in it the index or data/information every time there is a significant change. For example, a domestic water meter can write data in the non-volatile element, i.e., EEPROM, for every 10 liters or 10 gallons or 1 cubic foot. In the event that data has to be recovered from the non-volatile element, information would be returned with the resolution utilized in the process (up to the last 10 liters, 10 gallons, 1 cubic foot). This represents a very small loss of information. Even if someone destroyed the water meter, it is improbable that the non-volatile memory element would also be destroyed due to its small size. The size of such device is only 0.1 square inch (50 $mm^2$).

It is still another feature of the water meter of the present invention to measure hot water. In certain apartment buildings or complexes with centralized hot water the tenant (usually on the upper floors) must run the hot water for a few minutes until the water reaches the desired temperature. The tenant has to pay for a large quantity of cold water, at the price of hot water, because conventional meters measure all the water that passes through it regardless of the temperature. This hot water meter only begins measuring water when the water reaches a predetermined temperature.

A temperature sensor NTC (Negative Temperature Coefficient Resistor or Thermistor) is placed in contact with the exterior part of the tube (inlet pipe of the water meter). The sensor is capable of measuring temperature of the water with great precision. The temperature of the water is about the same as the temperature of the external wall of the tube because the metal tube has a thin wall and has high thermal conductivity. When water circulates through the meter, it measures its temperature and only measures water when it passes the threshold of the desired temperature.

Figure 3:
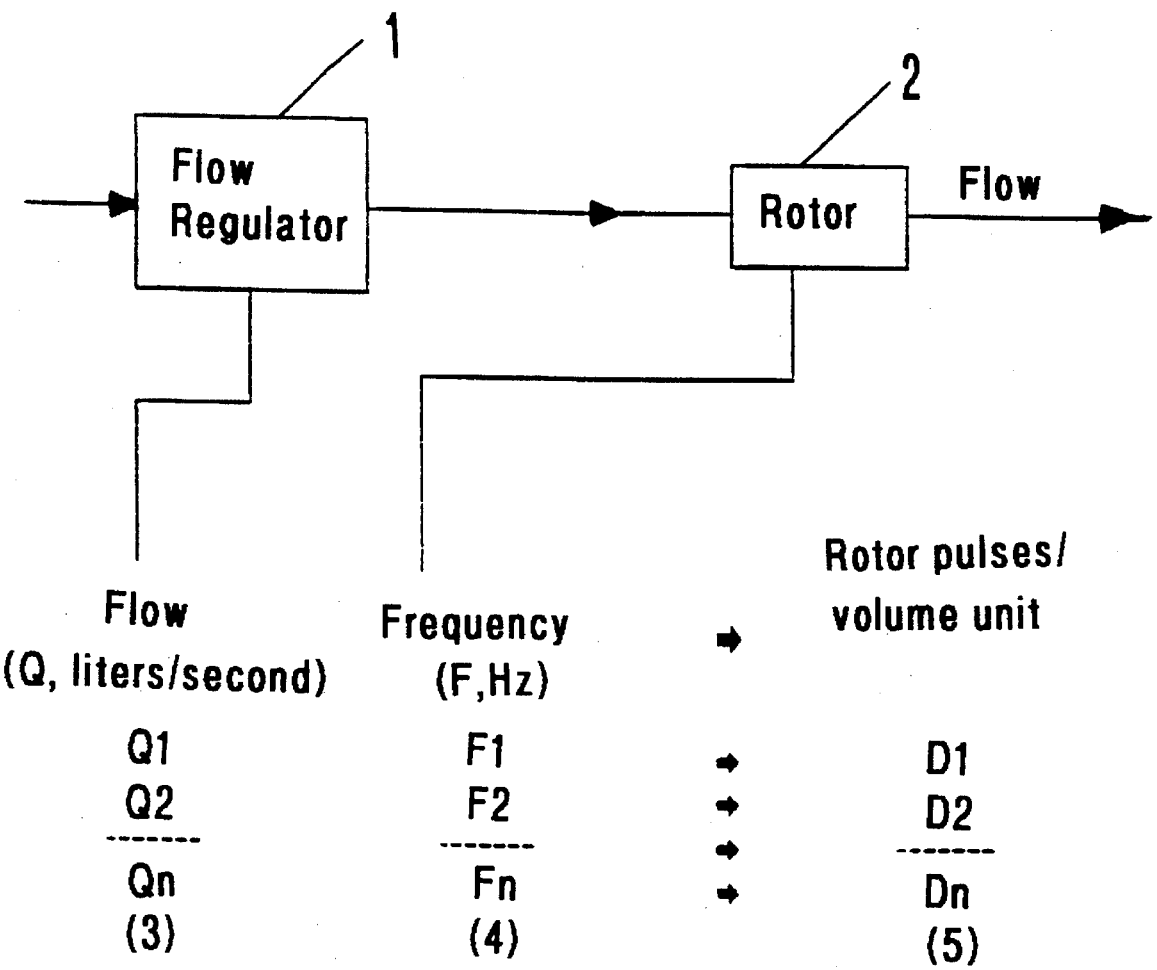
FIG. 3. This diagram shows a characterization of the rotor in the test bench and shows the revolution frequency for each possible flow rate.

The detection of temperature using thermistors is widely used and the following book deals with this topic: *The Art Of Electronics*, Paul Horowitz, Winfield Hill, Cambridge University Press. 1989, ISBN 0-521-37095-7, page 992. FIG. 3.1 is a preferred schematic diagram.

Another feature is internal failure (error indication). The meter has a self-test function that autodiagnoses certain types of errors, failures or breakdowns. If it detects any of these conditions, the meter activates an error bit and turns on a letter "E" in red on the display (LCD). See FIG. 8. This bit is also transmitted when an automatic meter reading is taken, for example, by telephone.

The system disposes of redundant data and brings up to date redundant saved information in the EEPROM and in part the RAM. For the redundancy, 16 bit CRC codes (Cyclic Redundance) are used. All of the data contained in the EEPROM is duplicated in the RAM with a corresponding CRC code. When the EEPROM is modified, this also modifies its CRC. Approximately once a day and after a predetermined number of units of volume are measured, the consistency of the redundant system is verified (verifies the correction of the CRC's). If a CRC is not correct (for example, from the EEPROM) it verifies the correction of the CRC from other devices (from the RAM example). If this is correct it reestablishes the information in the device with a correct CTC. If various CRC's are incorrect the information is unrecoverable and that is when, and why, the error bit is activated.

Still another feature is the "Battery Condition Indicator" to indicate the condition of the battery (dry cell) which powers the electronics of the meter. An image of a battery is shown on the LCD display with a frame (FIG. 1.1, T8, T9) and three segments within the frame which can be on or off (T5, T6, T7 in FIG. 8). These segments classify the amount of battery life which remains unused in the meter, based on a preestablished criteria. The preferred display is: 3 segments, more than 25% available; 2 segments, more than 12% available; 1 segment, possible less than 12% (still functioning correctly); 0 segments, voltage too low, probably functioning incorrectly.

This allows the user to foresee the drainage of the battery and plan a preventive maintenance program. When the meter is read by a remote device (AMR), this information is also accessed but with greater resolution. It gives the percentage of the battery available in spurts of 0.4%. This allows for predictable maintenance as well as for preventive maintenance. The meter uses a lithium battery which provides a certain quantity of electrical power (charge measured in Culumbos or ampere hours). The best way of knowing how much charge is left is to measure the quantity of charge consumed. The meter discharges in ampere hours and therefore the amount of energy used can be calculated. Depending on whether or not the meter surpasses a preestablished threshold the segments are either left off or they are turned on. The data about ampere hours is contained in the microprocessor (or the utilized calculation device).

What is claimed is:

1. A method of making an electronic water meter to accurately measure the volume of water flowing through the meter especially at low flow rates to detect leakage, the meter comprising a body member through which the water flows, a magnetic rotor means mounted on the body and movable by the flow of water to produce magnetic signals corresponding to the frequency of rotor means movement, electronic circuit means mounted on the body member to detect the magnetic signals and convert the magnetic signals into digital signals which are frequency pulse signals, and an electronic correction circuit means mounted on the meter body member to correct for non-proportionality between water flow and rotor means movement frequency, the method including the steps of (a) dividing the digital signals by the number of digital signals produced by each complete movement of the rotor means;

(b) entering a set of corrections into a non-volatile integrated circuitry memory, the set of corrections being for each flow of water over a flow range of the meter;

(c) displaying on display means the volume of water as corrected by the electronic correction circuit;

(d) testing each individual water meter on a test bench with at least three water flow rates;

(e) comparing the rotor means of each individual water meter to a prototype rotor means at said three water flow rates;

(f) using the digital signals generated during said test to calculate the set of corrections for the individual meter to correct for differences between the rotor means and the prototype rotor means;

(g) entering the set of corrections into the no-volatile integrated circuit memory as the set of corrections for individual differences of each rotor means from the prototype; and (h) displaying on the display means a leakage indication for flows of water over a selected time below a selected amount.

2. A method as in claim 1 and including a battery to power the meter and wherein the non-volatile memory retains data although the meter is without battery power and the non-volatile memory is selected from the group of EEPROM, flash memory and non-volatile RAM.

3. A method as in claim 1 wherein the rotor is a turbine having a plurality of blades and each blade is magnetized.

4. A method as in claim 3 wherein the display indicates a fraud signal when the meter is opened or removed from a water line.

5. A method as in claim 1 wherein the display is an LCD (Liquid Crystal Display) mounted on the meter.

6. A method as in claim 1 and further including a battery mounted within the meter to power the meter and low battery indication means to count the usage time of the meter to determine the remaining battery life and to generate a signal indicating the remaining battery life.

7. A method as in claim 1 in which the meter is programmed and communicates over a transmission link including a telephone and radio transmission link and transmits a signal indicating leakage when the flow of water over a selected time is below a selected amount.

8. A method as in claim 1 wherein the non-volatile memory retains the latest meter reading although the meter is tampered with or destroyed.

* * * * *